United States Patent Office 3,310,890
Patented Mar. 28, 1967

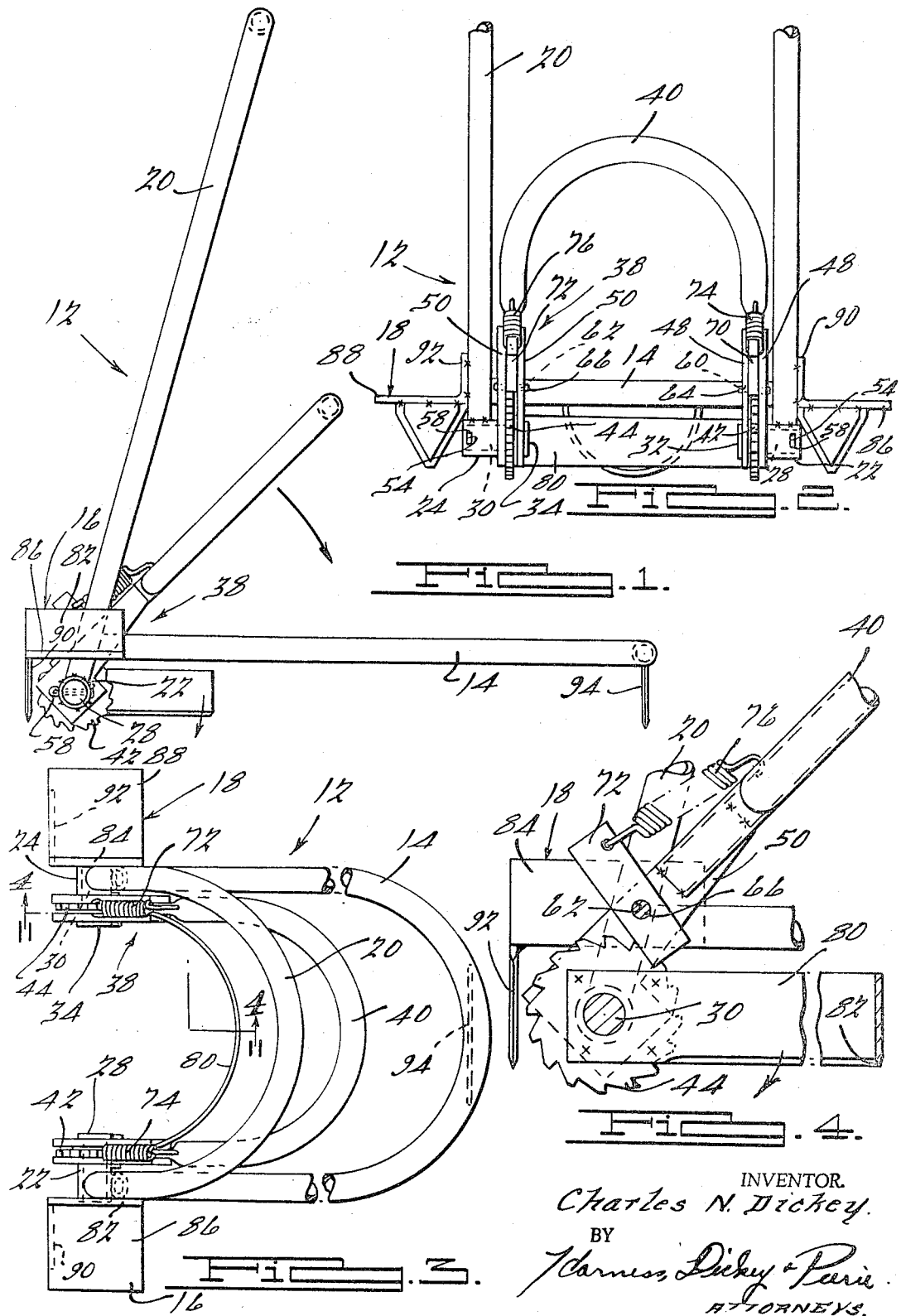

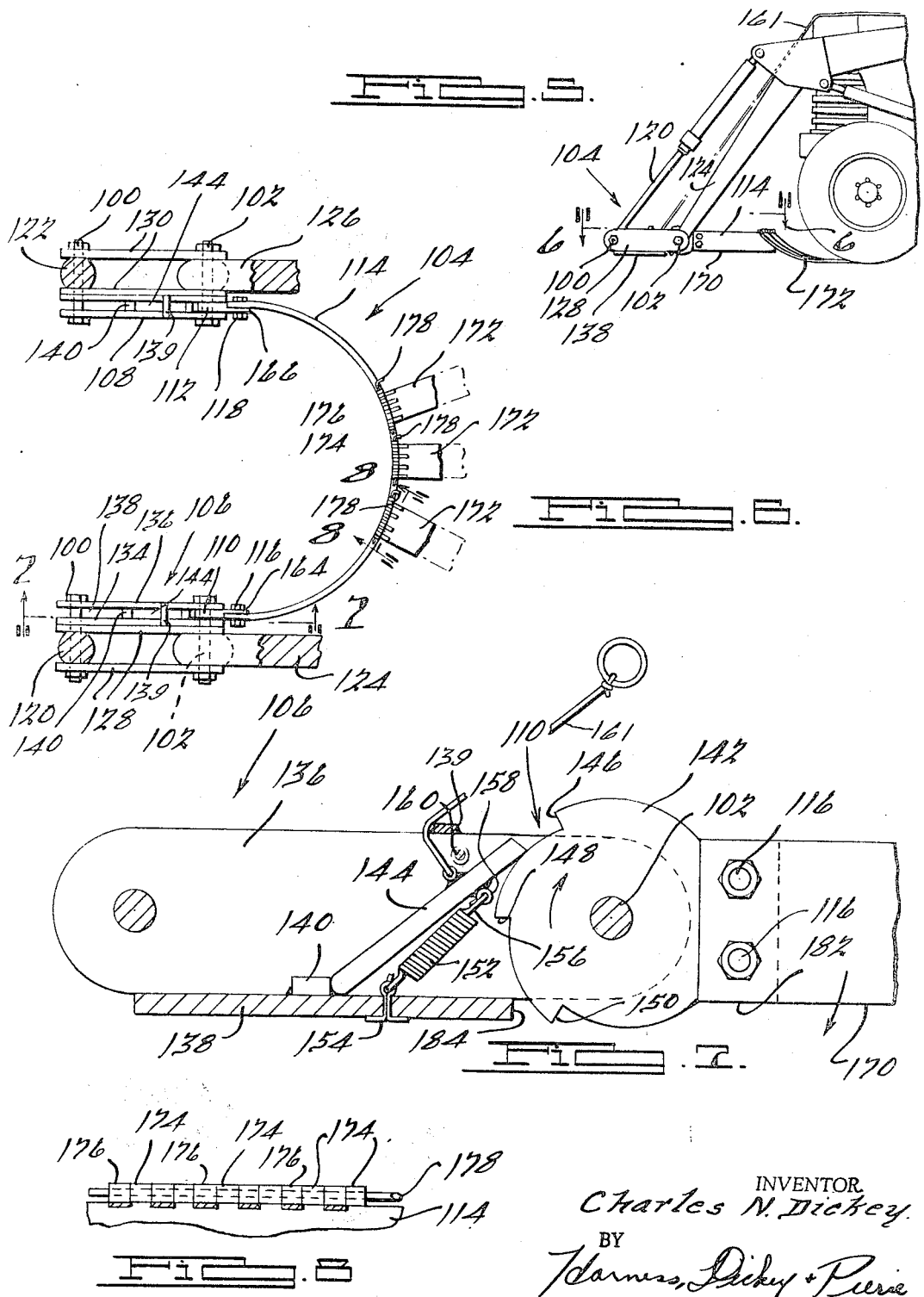

3,310,890
TREE DIGGING APPARATUS
Charles N. Dickey, 9826 Auburndale,
Livonia, Mich. 48150
Filed Sept. 28, 1964, Ser. No. 399,652
17 Claims. (Cl. 37—2)

The present invention relates generally to a method and apparatus for removing trees, shrubs, bushes and the like from the earth for transplanting, and more specifically to a novel method and apparatus for removing a substantially hemispherical ball of earth containing the roots of a tree therein for transplanting from one site to another.

Heretofore, when it was desired to remove a tree or the like from the ground for transplanting other than by means of a hand shovel the only devices available of which applicant is aware have had several drawbacks. Either they have been too complicated and costly to manufacture and use, or they have not been capable of removing at least a hemisphere of earth around the roots, or both. Certain of the prior art devices have provided scoop-like devices which enter the earth at a point spaced from the tree and, by maneuvering the scoop to a position below the tree and raising it, the tree is torn from the earth. Thus the roots have been torn and jagged and the earth has not been cleanly cut therearound to minimize the amount of earth which breaks away from the ball prior to wrapping or in transportation. Also, certain prior devices are manipulated by a series of successive thrusts of a spade-like device into the earth around the tree. In this situation it is necessary that the tractor or other implement which is used be successively maneuvered to a series of positions about the tree thus creating damage to the landscape around the tree. Certain prior art devices also suffer the disadvantage that they are operable only on trees or the like which are short enough that the device may be raised over them.

The instant invention provides a simple and easy method and apparatus for removing a tree from the earth and creating at least a full hemispherical ball of earth about the roots of the tree. The present invention is designed to overcome certain deficiencies of the prior art, thus facilitating the removal and planting of trees on an estate, or the like, or in removing the trees from a nursery or orchard for transplanting purposes or for balling and sale on the market.

With the devices of both forms of the present invention, chosen for illustrative purposes only, a user may position the devices adjacent the base of the tree to be removed, with a pair of frame sections centered on and equally spaced from the trunk thereof. An arcuate blade member is attached to the frame sections forming a general arc about and spaced from the trunk of the tree, starting at one frame member and extending to the other. By a series of arcuate movements, the blade is successively urged through a plurality of predetermined angles which define a substantial hemisphere about the roots of the tree. The device is so designed that the total angle through which the blade may be passed is greater than 210°, thus forming a ball which is greater than hemispherical in shape. In this manner the ball of earth which is created may be easily removed from the area by tilting the tree and rolling the ball away.

Also, the ball may be easily and uniformly provided with a burlap covering to protect the roots and the earth clinging thereto. Further, in the situation where a plurality of trees are being transported from one place to another, the tree may be dug by the apparatus described herein and the hole may also be dug by the same apparatus, thus providing a uniformity in the ball of the tree and also the ball of earth removed from the new location for the tree. In this way the transplanting of trees may be greatly facilitated when they are being moved from one spot to another on an estate or in a nursery.

Accordingly, it is one object of the present invention to provide an improved tree transplanting apparatus.

It is another object of the present invention to provide a tree removal apparatus which operates to provide a uniform ball of earth about the roots of the tree.

It is another object of the present invention to provide a tree removal apparatus which is simple and easy to use.

It is still another object of the present invention to provide a tree removal apparatus which is inexpensive to manufacture and rugged in construction.

It is still another object of the present invention to provide a tree removal apparatus which is readily operated by hand and requires no more than the weight of a man to operate.

Still another object of the present invention is to provide a tree removal apparatus which may be readily applied to the front end of certain common vehicles now in use.

A still further object of the present invention is to provide an improved method of removing trees from the earth.

A still further object of the present invention is to provide an improved method of removing trees from the earth which, through a plurality of successive arcuate movements of a blade through the earth, will provide a tree having a substantially uniform ball of earth attached thereto.

Still another object o fthe present invention is to provide an improved method and apparatus for removing trees which minimizes the damage to the landscape surrounding the trees.

Still another object of the present invention is to provide an improved method and apparatus for removing trees from the earth which minimizes the damage and danger to the trees being removed.

Another object of the present invention is to provide an improved method and apparatus for removing trees which facilitates the removal of the trees from the apparatus after removal from the ground.

Another object of the present invention is to provide an improved tree digging method and apparatus which greatly reduces the time involved in transplanting trees either for sale or replanting.

Further objects, features and advantages of the present invention will become apparent from a consideration of the following description, the appended claims and the accompanying drawings, in which:

FIGURE 1 is a side view of an embodiment of the invention illustrating certain features thereof.

FIG. 2 is a end view of the embodiment of FIGURE 1;

FIG. 3 is a top view of the device illustrated in FIGURE 1;

FIG. 4 is a partial sectional-view of the device illustrated in FIGURE 3, taken along lines 4—4 thereof;

FIG. 5 is a side view of the power driven embodiment of the present invention as it is attached to a front end loader tractor which is partially illustrated;

FIG. 6 is a top view of a portion of the front end loader illustrating the present invention;

FIG. 7 is a sectional-view of the device of FIGURE 6, taken along lines 7—7 thereof; and FIG. 8 is a sectional-view of the attachment of the straps to the blade of FIGURE 6, taken along line 8—8 thereof.

Referring now to the drawings, and particularly to FIGURES 1 to 4 thereof wherein is illustrated a manually operated tree digger 12, having a generally arcuate shaped, tubular base member 14 attached to a pair of frame members 16 and 18 at either end thereof. A generally vertically disposed, arcuate, tubular handle member 20 is attached adjacent either end thereof to frame members 16 and 18 and the extreme ends of the handle member 20 are suitably attached to a pair of tubular stud guides 22 and 24. Thus, the base member 14 and the handle member 20 are rigidly connected to the axle guides 22 and 24 with the base member 14 and the handle member 20 disposed at a relatively large angle relative to each other. The angle of the handle member 20, with respect to the ground, is sufficiently less than 90 degrees to allow the top thereof to clear the trunk of the tree when the digger 12 is in position. The tubular guides 22, 24 are adapted to receive a pair of axle studs 28 and 30 which have been formed with heads 32, 34 at one end thereof.

The axle studs 28, 30 are adapted to pivotally support a ratchet and blade assembly 38 comprising an actuator member 40 and a pair of ratchet wheels 42, 44 positioned at either end of the actuator member 40. The member 40 is an arcuate shaped tubular member with each of its ends flattened to provide a surface to receive a pair of yoke members 48 and 50 suitably welded to each flattened end of the actuator 40. As best seen in FIGURE 2, the yoke members 48 and 50 form spaces in which the ratchet wheels 42, 44 are received and both of the ratchet wheels 42, 44 and yoke members 48, 50 are rotatably mounted on the studs 28, 30. The stud guides 22 and 24 are provided with a pair of holes 54, which are adapted to be aligned with a pair of holes formed in the stud members 28 and 30. A cotter pin 58 is passed therethrough, thus locking the stud guides 22, 24 to the stud members 28, 30.

Intermediate portions of the yoke members 48, 50 are provided with apertures 60, 62 which are adapted to receive rivet pins 64, 66, or other suitable fasteners, to provide pivotal mounts for a pair of pawl members 70 and 72, as best seen in FIGURE 4. One end of the pawl members 70, 72 is adapted to engage the teeth of the ratchet members 42, 44 to angularly urge the ratchet members 42, 44 about the studs 28, 30 as the handle member 40 is moved downwardly. The edge of the pawl members 70, 72 are resiliently maintained in engagement with the teeth of the ratchet members 42, 44 by means of a pair of springs 74, 76 which are attached at one end thereof to the pawl members 70, 72 through an aperture formed therein, and at the other end thereof to an aperture formed in the handle member.

Thus, as the handle member 40 is operated downwardly, as by stepping on it by the user, with the pawl members 70, 72 in engagement with the teeth of the ratchet members, the ratchet members 42, 44 will be rotated through a small arc which is determined by the amount of downward movement of the actuator 40. A generally arcuate flat blade member 80 is suitably welded at either end thereof to the ratchet wheels 42, 44 and is adapted to move with the ratchet wheels 42, 44 as they are pivoted downwardly by the movement of foot actuator 40. The blade 80 is formed of generally flat, relatively sturdy steel having along the lower portion thereof a sharpened edge 82, which is adapted to cut around the roots of the tree and form a ball of earth therearound which is slightly greater than a hemisphere.

The frame members 16 and 18 are formed with a generally vertically disposed portion 82, 84 which is attached to the base member 14 and the handle member 20, as described above, and a generally flat horizontal portion 86, 88 which has a pair of flat spade members 90, 92. The spade members 90, 92 are adapted to be driven into the earth when the device is in use to provide horizontal stability to the digger 12. The base member 14 is similarly provided with a spade member 94, which also is driven into the earth to further stabilize the apparatus as it is in use.

In the operation of the device, the tree digger 12 is positioned adjacent a tree that is to be dug up with the trunk thereof generally equally spaced between the two frame members 16 and 18. The foot of the user is then placed on the generally horizontal plates 86, 88 and with a downward motion, the spade members 90, 92 are driven into the ground along with the ratchet assemblies 42 and 44. In nursery areas, the ground being extremely well worked, it has been found that a relatively small force is needed to drive members 90, 92 into the ground. Then the spade member 94 is similarly driven into the ground with the foot of the user, thereby rendering base member 14 generally level with the ground.

The operator then stands on foot actuator 40 while holding handle 20 to steady himself, and, with the weight of the user, the foot actuator 40 is forced downwardly thereby rotating ratchet wheels 42 and 44. When the foot actuator 40 is forced downwardly a sufficient distance, as determined by the operator, the operator gets off of the foot actuator 40 and lifts it to allow pawl members 70 and 72 to engage other teeth of the ratchet wheels 42, 44. It is to be noted that the dragging of the pawl members 70 and 72 across the teeth of ratchet members 42, 44 have a tendency to clean the teeth thereby freeing them of any dirt and other foreign material. This operation is continued until the blade 80 has been driven completely through its arc of travel and out of the ground on the opposite side of the tree, i.e., from an angle which is generally upwardly from that shown in FIG. 4 to another angle which is in excess of 180° therefrom, thus forming a ball of earth about the roots of the tree to be removed.

This manually powered embodiment is particularly suited for relatively small trees or scrubs, e.g., those in which a ball diameter of approximately 12 inches or less is adequate. After the hole has been completed the tree or scrub may be lifted out by hand by merely grasping the trunk thereof.

Referring now to FIGURES 5 to 8 of the drawings, there is illustrated a power driven tree digger which is generally similar in construction and operation to the manual digger described above. As illustrated in FIG. 5, the power driven digger is adapted to be attached between the usual leading support arms, such as indicated at 124 and 126, and the usual power cylinder rods, such as shown at 120 and 122, of a conventional front loader or similar vehicle. The attachment is accomplished by removing the pins of bolt assemblies 100, 102 holding the bucket of the front loader to the tractor and removing the bucket therefrom. The bolt members 100, 102 are then utilized to attach the automatic tree digger, indicated generally at 104, to the front end of the tractor in a manner to be hereinafter described. Generally speaking, automatic tree digger assembly 104 comprises a pair of frame assemblies 106 and 108 horizontally spaced one from the other, pawl and ratchet assemblies 110 and 112, and a blade assembly 114 attached to the pawl and ratchet assemblies at either end thereof by means of a plurality of bolts 116, 118.

The front end of each of the frame assemblies is attached to hydraulically actuated power cylinder rods 120 and 122 by means of nut and bolt assemblies 100, as particularly shown in FIGURE 5, and the rear end of frame assemblies 106 and 108 are attached to arms 124 and 126 by means of nut and bolt assemblies 102. The ends of the power cylinder rods 120, 122 are spaced from the pair of rigid arms 124, 126 by means of a plurality of pairs of spacer plates 128, 130. Thus the power and rigid members of the front loader are given structural rigidity in operation. The frame assemblies 106, 108 and pawl and ratchet assemblies 110 and 112 are substantially identical, therefore only one side of each of these assemblies will be described herein.

Referring particularly to FIGURES 6 and 7, it is seen that the frame assembly 108 comprises a pair of parallelly spaced, generally horizontally disposed side plates 134, 136 which are rigidly attached to each other by means of a bottom plate 138 and an upper rod 139. The side plates 134, 136 are suitably welded to the bottom plate 138 and rod 139 as is a stop member 140 which is welded to the top surface of the bottom plate 138. A pivotal axis is provided by bolt assembly 102 passing through the back end of side plates 134, 136 for ratchet wheel 142 of the pawl and ratchet assembly 110.

The pawl comprises a rigid member 144 which abuts stop member 140 at one end thereof and the other end is adapted to successively engage a plurality of teeth 146, 148 and 150 on ratchet wheel 142 as the tree digger is operated. The pawl is adapted to be pivotable about a point which is generally in the area of the contact between the rigid member 144 and the stop member 140. The pawl is resiliently urged against the ratchet wheel by means of a spring 152. Spring 152 is attached at the bottom to bottom plate member 138 by means of a key or keeper 154 which passes therethrough, and the top thereof is provided with a hook 156 passing through an eye 158 suitably attached to the lower surface of pawl 144. The upward movement of the pawl member is limited by means of a stop rod 160, which is suitably mounted between side members 134 and 136.

Thus, as the upper end of pawl 144 rises with the increasing radius of the surfaces between teeth 146 and 148, and 148 and 150, and between tooth 150 and blade member 114, the pawl will be allowed to rise until such time as the pawl 144 engages the next tooth, whereupon it will be resiliently urged downwardly by spring member 152. The upper surface of the pawl 144 may be provided with an eye and wire assembly 161 to enable the pawl 144 to be disengaged from the ratchet wheel when desired. The wire should be of sufficient length to reach a position conveniently accessible by the user, and a loop may be provided to facilitate its use.

Blade assembly 114 is attached at each end thereof to a pair of tab portions 164 and 166 formed at a rearward portion of each of the ratchet members 142, the attachment being made by means of a plurality of pairs of nut and bolt assemblies 116 and 118. The blade is generally semicircular in configuration disposed rearwardly of frame assemblies 106 and 108, and has a lower edge 170 thereof suitably sharpened to enable it to easily pass through the earth around and below the tree. Thus, as ratchet 142 is progressively rotated about axis 102 the blade is progressively swung through its arcuate path of travel. The spacing of the teeth 146, 148 and 150 in this embodiment is so calculated as to progressively carry the blade through two angles of 60° and then one of 90° respectively, to make a total angle of 210°. These angles may be varied in accordance with the characteristics of the tractor being used, however, these angles have been found to make the digger universally acceptable to all present front end loaders, insofar as cylinder rod stroke length is concerned.

The upper rear edge of the blade 114 is provided with a plurality of strap members 172 which may be formed of leather, canvas or any other strong yet flexible material. As is particularly shown in FIGURE 8, the blade 114 is formed with a plurality of upwardly extending eyelet portions 174 having apertures therein and the strap members are similarly provided with mating eyelet members 176 having apertures therein which are adapted to align with the apertures in the eyelets 174. A pin 178 is then passed through the apertures formed in the eyelets 174, 176 to rigidly fasten the straps 172 to the blade 114. The other end of the straps are left unattached prior to the first use of the tree digger-tractor combination for a reason to be hereinafter explained.

In operation, the tractor is moved to a position adjacent the tree to be removed such that the trunk of the tree is positioned generally between nut and bolt assemblies 102 and equally spaced therefrom. The rigid arm members 124, 126 are then hydraulically pushed into the ground a short distance to a point where the ratchets 142 are partially buried. It is to be noted that when this occurs blade 114 will assume a slightly upwardly inclined position with pawls 144 brought closer to first teeth 146. The hydraulic cylinder member 120 is then hydraulically retracted thereby raising the outer end of frame assemblies 106, 108. As the outer ends of frame assemblies 106, 108 are moved upwardly, pawl members 144 drive first tooth 146 of ratchet 142 in an arc, thereby driving the blade 114 into the ground through an angle of 60°. The hydraulic members 120, 122 are again extended and the edge of pawl 144 slides along the surface between teeth 146, 148 until the end of pawl 144 engages the next tooth 148. It is again to be noted that the dragging of pawl 144 over the surfaces between the teeth has a tendency to clean ratchet wheel 142 as described above. Hydraulic member 120 is then actuated to raise the outer end of frame assemblies 106, 108 and blade 114 is driven through a second angle of 60°. The hydraulic member 120 is again extended until tooth 150 is engaged and the hydraulic member 120 is again retracted to complete the cycle of blade member 114 by driving it through an additional angle of 90°. A hemispherical ball has now been completely cut from the earth with the roots of the tree contained therein.

At this point, the free ends of strap members 172 may be attached to the tractor. This attachment is preferably done after the first tree, with its associated ball of earth, has been cut so that the proper amount of slack to leave in the straps, for the tractor used, will be known. The straps may be attached to any part of the front end loader, such as the cross arms, frame, support arms, or the like, in any conventional manner, such as by passing the cable through conventional eyelets provided in the ends of the straps and then securing the ends of the cable to the tractor. As will be appreciated, for subsequent trees the straps will have previously been attached to the tractor so that this operation need be performed only once.

After the hemispherical ball of earth has been completely cut, it may be raised out of the hole formed by raising arms 124, 126. The tractor may then be backed up a short distance and the ball gently lowered to the level ground adjacent the hole by lowering these arms. At this point, the ball may be wrapped with the burlap or chicken wire in the conventional manner and secured in place by using nails or the like. The top and bottom of the wrapping may be tightened about the ball in the usual manner, such as by using a tag twister.

At this point, the blade will be positioned generally horizontally, extending away from the tractor, and the lower surface 182 of tab portions 164 and 166 will be in engagement with the edge 184 of bottom plate member 138. To remove the ball the hydraulic cylinders may be actuated in an advancing direction to cause surface 184 to drive tab portions 164 and 166 of the blade in a reverse direction for approximately 90°, at which point the blade will be disposed substantially beneath the ball. The process may then be completed by tilting the tree slightly and rolling the ball off the blade. As will be appreciated, prior to removing the ball from the digger, if desired, it may be carried by the tractor in the digger to either a truck or directly to the location where it is to be replanted, and then be removed.

The apparatus described above may also be used to dig the hole where the tree is to be transplanted by merely following the procedures described above. It is also to be noted that the assembly described does not necessitate moving the tractor about a series of positions about the trunk of the tree.

As stated above, the described power apparatus may be used with many sizes of tractors and also the device may be supplied with various sizes of blades. In order to achieve the proper attachment of the device to the tractor, a plurality of shims or spacers may be placed between the inboard plates 128, 130 and the outboard plates 134 of the frame assembly. In this manner, the variation in the spacing of the inboard plates 128, 130 and frame assemblies 106, 108 may be compensated.

While it will be apparent that the embodiment of the invention herein disclosed is well calculated to fulfill the objects of the invention, it will be appreciated that the invention is susceptible to modification, variation and change without departing from the proper scope or fair meaning of the subjoined claims.

What is claimed is:

1. A digger for removing trees or the like from the ground, comprising; a substantially arcuate blade mounted for arcuate movement through the ground about an axis substantially at ground level and passing through the trunk of the tree, and means for moving the blade through an arc of at least 180° for cutting a substantially continuous hemispherical ball of earth from the ground containing the roots of the tree including means for substantially fixing the pivot of the blade relative to the tree and means for rotating the blade about its axis in successive increments in the same direction through said 180°.

2. The digger of claim 1 wherein said means for moving the blade through an arc includes ratchet means.

3. The digger of claim 2 wherein said ratchet means moves said blade in successive, substantially continuous increments through the ground.

4. A digger for removing trees or the like from the ground comprising; a substantially arcuate blade mounted for arcuate movement though the ground about an axis substantially at ground level and passing through the trunk of the tree, means for moving said blade through an arc of at least 180° and cutting a substantially hemispherical ball of earth containing the roots of the tree from the ground including means for substantially fixing the pivot of the blade relative to the tree, and foot operated actuating means for applying actuating forces to said moving means including means for rotating the blade about its pivot in successive increments in the same direction through said 180°.

5. The digger of claim 4 wherein said means for moving the blade through an arc includes ratchet means and said foot actuating means is operated to apply successive forces to said moving means.

6. The combination of claim 4 further including strap means connected to an outer periphery of said blade, said strap passing under the hemispherical ball as said blade is moved through said arc to facilitate removal of said hemispherical ball.

7. A digger for removing trees or the like from the ground comprising; a substantially arcuate blade mounted for movement through the ground, means including ratchet wheels connected to said blade for moving said blade through an arc of at least 180° in successive increments and cutting a substantially hemispherical ball of earth containing the roots of the tree from the ground, and foot operated actuating means for applying successive forces to said moving means including a generally arcuate foot actuator having yokes formed at either end thereof, and pawl members resiliently supported on said yokes and engaging said ratchet wheels for transmitting the successive forces to said ratchet wheels.

8. A digger for removing trees or the like from the ground comprising; a substantially arcuate blade mounted for movement through the ground, means connected to the ends of said blade including toothed ratchet wheels for pivotally moving said blade through an arc of at least 180° in successive increments and cutting a substantially hemispherical ball of earth containing the roots of the tree from the ground, and foot operated actuating means for applying successive forces to said moving means including a generally arcuate foot actuator having yokes formed at either end thereof, and pawl members resiliently pivotally supported on said yokes and engaging the teeth on said ratchet wheels for transmitting the successive forces to said ratchet wheels.

9. In combination with a front loader or like power vehicle having a pair of rigid members and a pair of reciprocably hydraulically operated cylinder rods on the front thereof, a digger for removing trees or the like from the ground comprising; a pair of frame assemblies each having a fixed pivot connected to each of said rigid members and a movable pivot connected to and actuated by said cylinder rods, a substantially arcuate blade mounted for movement through the ground, means including ratchet means connected to said blade and actuated by said frame assemblies for moving said blade in a first direction in response to the movement of said frame assemblies through an arc greater than 180° in a plurality of successive increments, and means including said frame assemblies and said ratchet means for moving said blade in a second direction opposite to said first direction through a portion of said arc, said blade cutting a substantially hemispherical ball of earth containing the roots of the tree from the ground.

10. The combination of claim 9 further including strap means connected to an outer periphery of said blade, said strap passing under the hemispherical ball as said blade is moved through said arc to facilitate removal of said hemispherical ball.

11. A digger for a vehicle having a powered attachment including at least one movable arm and a powered hydraulic piston and cylinder assembly associated therewith, said digger comprising a generally arcuate blade, mounting means for mounting said blade to the movable arm for pivotal movement with respect thereto through the ground, the pivotal axis of said blade being positioned substantially at ground level and passing through the trunk of a tree, and drive means drivingly connected to said blade and actuable by linear movement of the hydraulic piston to rotate said blade in successive increments in one direction about its pivotal axis through an arc greater than 180° with respect to the arm, whereby said blade will cut a substantially hemispherical ball of earth containing the roots of the tree from the ground.

12. A digger as claimed in claim 11, wherein said blade has secured thereto at least one flexible strap adapted to be pulled through the ground behind the blade upon actuation of the latter to facilitate removal of said hemispherical ball.

13. A digger for a vehicle having a powered attachment including at least one movable arm and a powered hydraulic piston and cylinder assembly associated therewith, said digger comprising a generally arcuate blade, mounting means for mounting said blade to the movable arm for pivotal movement with respect thereto through the ground, and ratchet drive means drivingly connected to said blade and actuable by the hydraulic piston on successive strokes thereof to move said blade in successive increments in the same direction through an arc of at least 180° with respect to the arm, whereby said blade will cut a substantially hemispherical ball of earth containing the roots of the tree from the ground.

14. A digger as claimed in claim 13, wherein said blade has secured thereto at least one flexible strap adapted to be pulled through the ground behind the blade upon actuation of the latter to facilitate removal of said hemispherical ball.

15. A digger for removing trees or the like from the ground, comprising a base member assembly engageable with the ground, a substantially arcuate blade pivotally mounted to said base member for arcuate movement through the ground about an axis substantially at ground level and passing through the trunk of a tree, said blade adapted to move from a first position on one side of the tree and substantially at ground level to a second position on the opposite side of the tree, said base member assembly being interconnected with the pivot of said blade for substantially fixing said pivot relative to the ground when said base member assembly is in engagement with the ground, said base member having a portion extending from the pivotal axis of said blade in the same direction as and a greater distance than said blade when the latter is in said first position, and driving means for moving said blade through an arc of at least 180° with respect to said base portion for cutting a substantially hemispherical ball of earth from the ground containing the roots of the tree.

16. A digger as claimed in claim 15, wherein said driving means includes ratchet means drivingly connected to said blade and manually operable means for actuating said ratchet means to move said blade through an arc of at least 180°.

17. A digger for removing trees or the like from the ground, comprising a substantially arcuate blade mounted for arcuate movement through the ground about an axis substantially at ground level and passing through the trunk of a tree, means for moving the blade through an arc of at least 180° for cutting a substantially hemispherical ball of earth from the ground containing the roots of the tree, and strap means connected to the outer periphery of said blade and passing under the hemispherical ball as said blade is moved through said arc to facilitate removal of said hemispherical ball.

References Cited by the Examiner

UNITED STATES PATENTS

| | | | |
|---|---|---|---|
| 1,278,758 | 9/1918 | Sahlberg | 37—2 X |
| 1,295,364 | 2/1919 | Peterson | 37—2 |
| 2,410,203 | 10/1946 | Culley | 37—2 |
| 2,549,476 | 4/1951 | Johnson. | |
| 2,755,570 | 7/1956 | Blackburn et al. | 37—2 |
| 2,770,076 | 11/1956 | Kluckhohn | 214—3 X |
| 3,045,368 | 7/1962 | Whitcomb | 214—3 X |

HUGO O. SCHULZ, *Primary Examiner.*